(12) United States Patent
Horowitz et al.

(10) Patent No.: US 11,928,209 B2
(45) Date of Patent: Mar. 12, 2024

(54) RESOURCE CONSERVATION SYSTEM FOR SCALABLE IDENTIFICATION OF A SUBSET OF INPUTS FROM AMONG A GROUP OF INPUTS THAT CONTRIBUTED TO AN OUTPUT

(71) Applicant: Bank of America Corporation, Charlotte, NC (US)

(72) Inventors: Justin Horowitz, Fort Mill, SC (US); Melissa Podrazka, Chicago, IL (US); Sameer Sharma, Toronto (CA)

(73) Assignee: Bank of America Corporation, Charlotte, NC (US)

( * ) Notice: Subject to any disclaimer, the term of this patent is extended or adjusted under 35 U.S.C. 154(b) by 286 days.

(21) Appl. No.: 17/541,428

(22) Filed: Dec. 3, 2021

(65) Prior Publication Data

US 2023/0177150 A1    Jun. 8, 2023

(51) Int. Cl.

| | |
|---|---|
| G06F 21/55 | (2013.01) |
| G06F 18/21 | (2023.01) |
| G06F 21/57 | (2013.01) |
| G06N 3/045 | (2023.01) |

(52) U.S. Cl.
CPC ........ *G06F 21/552* (2013.01); *G06F 18/2193* (2023.01); *G06F 21/577* (2013.01); *G06N 3/045* (2023.01)

(58) Field of Classification Search
CPC .. G06F 21/552; G06F 18/2193; G06F 21/577; G06N 3/045; G06N 5/045; G06N 3/084
See application file for complete search history.

(56) References Cited

U.S. PATENT DOCUMENTS

| | | | |
|---|---|---|---|
| 9,483,732 B1* | 11/2016 | Milakovich | H04H 60/94 |
| 10,357,713 B1* | 7/2019 | Landers | A63F 13/40 |
| 2011/0055852 A1* | 3/2011 | Smith | G06Q 40/08 |
| | | | 719/318 |

(Continued)

OTHER PUBLICATIONS

Lundberg et al., "A Unified Approach to Interpreting Model Predictions," NIPS, 2017.

(Continued)

*Primary Examiner* — Javier O Guzman
(74) *Attorney, Agent, or Firm* — Weiss & Arons LLP

(57) ABSTRACT

A resource conservation system, including a determination processor may be provided. The determination processor may identify a characterization output that characterizes a plurality of data structures. The characterization output may be based on plurality of inputs. The inputs may be processed through a plurality, or cascade, of artificial intelligence models both in sequence and in parallel. A numerical value may be identified for each data structure. The value may identify a degree of certainty that the determination processor accurately characterized each data structure. When the degree is above a threshold, the determination processor may identify a subset of inputs that most contributed to the characterization output. The determination processor may execute an equation to identify a subset of inputs that most contributed to the output. The equation may involve inputs and/or outputs of each of the cascade of models. Identified inputs may be ranked based on contribution to the outcome.

14 Claims, 3 Drawing Sheets

(56) References Cited

U.S. PATENT DOCUMENTS

| | | | |
|---|---|---|---|
| 2021/0067549 A1* | 3/2021 | Chen | G06N 3/084 |
| 2021/0295338 A1 | 9/2021 | Kreth et al. | |
| 2021/0350487 A1* | 11/2021 | Kelton | G06Q 30/0201 |
| 2022/0044199 A1* | 2/2022 | Pati | G06Q 40/02 |
| 2022/0138532 A1* | 5/2022 | Dalli | G06N 3/048 |
| | | | 706/27 |
| 2022/0222683 A1* | 7/2022 | Patten, Jr. | G06V 10/762 |

OTHER PUBLICATIONS

Sundararajan et al., "Axiomatic Attribution for Deep Networks," International Conference on Machine Learning, Jun. 13, 2017.

"Integrated Gradients," https://www.tensorflow.org/tutorials/interpretability/integrated_gradients, Mar. 19, 2021.

Kumar et al., "Problems with Shapley-Value-Based Explanations as Feature Importance Measures," International Conference on Machine Learning, Jun. 30, 2020.

Renu Khandelwal, "Understanding Deep Learning Models with Integrated Gradients," https://towardsdatascience.com/understanding-deep-learning-models-with-integrated-gradients-24ddce643dbf, Nov. 4, 2020.

Horowitz et al., "A Fresh Perspective on Dissecting Action into Discrete Submotions," https://www.ncbi.nlm.nib.gov/pmc/articles/PMC8734945/, Aug. 2016.

Lemay et al., "Modulation and Vectorial Summation of the Spinalized Frog's Hindlimb End-Point Force Produced by Intraspinal Electrical Stimulation of the Cord," https://pubmed.ncbi.nlm.nih.gov/11482358/, IEEE Transactions on Neural Systems and Rehabilitation Engineering, vol. 9, No. 1, Mar. 2001.

Prof. Michael Robinson, "Conglomeration of Heterogeneous Content Using Local Topography (CHCLT)," https://www.drmichaelrobinson.net/simplex_techrep.pdf, Mar. 11, 2015.

"Transformer Neural Network Architecture," https://devopedia.org/transformer-neural-network-architecture, Devopedia, Jun. 15, 2022.

Lundberg et al., "A Unified Approach to Interpreting Model Predictions," https://arxiv.org/abs/1705.07874, University of Washington, May 22, 2017.

Hubel et al., "Receptive Fields of Single Neurons in the Cat's Striate Cortex," https://physoc.onlinelibrary.wiley.com/doi/epdf/10.1113/jphysiol.1959.sp006308, Apr. 22, 1959.

* cited by examiner

RESOURCE CONSERVATION SYSTEM FOR SCALABLE IDENTIFICATION OF A SUBSET OF INPUTS FROM AMONG A GROUP OF INPUTS THAT CONTRIBUTED TO AN OUTPUT

FIELD OF TECHNOLOGY

Aspects of the disclosure relate to explainable artificial intelligence.

BACKGROUND OF THE DISCLOSURE

Artificial intelligence can be defined as the capability of a computer to simulate tasks typically associated with human beings. Various applications of artificial intelligence may include natural language processing, speech and handwriting recognition and machine vision.

Some of the capabilities associated with artificially intelligent computers may include the capability to reason, the capability to discover meaning and the capability to generalize. For the purposes of this application, the capability to reason may be understood to mean the ability to comprehend an objective, if any, attributable, to a set of circumstances. For the purposes of this application, the capability to discover meaning may be understood to mean the ability to understand the cause and significance of a set of circumstances. For the purposes of this application, the capability to generalize may be understood to mean the ability to apply past experience to analogous new experiences.

In order to simulate human intelligence in a computer, an initial step may include identification and understanding of various aspects of human intelligence. Such aspects may include learning, reasoning, problem solving, perception, use of language and self-correction.

Upon identification and understanding of human intelligence, a second step may include building an artificial intelligence model. An artificial intelligence model may be a tool or algorithm which is based on a certain data set through which the model can determine a prediction. The following is a sampling of artificial intelligence models: a linear regression model, deep neural networks, a logistic regression model and decision trees.

A linear regression model may predict the value of a dependent variable based on a given independent variable.

A deep neural network is a model that includes multiple hidden layers between the input and the output. Each of the hidden layers includes artificial neurons that are interconnected. Deep neural networks typically learn from labeled training data in order to predict an output based on inputs in a production environment.

Logistic regression is a statistical model that can predict the class of the dependent variable from a set of given independent variables. Logistic regression is similar to linear regression except that it is typically used in solving classification-based problems.

A decision tree model is typically used to arrive at a conclusion. The conclusion is based on the data from past decisions. The decision tree model divides the data into smaller portions in a way that resembles the structure of a tree.

Various other models may include a linear discriminant analysis model, a naïve bayes model, support vector machines, a learning vector quantization model, a K-nearest neighbors model and a random forest model.

It should be appreciated that the group of artificial intelligence models may be divided into groups of supervised models and groups of unsupervised models. Supervised models may utilize labeled datasets to determine an outcome or a prediction. Supervised learning models learn various nuances from the training set and apply those learned nuances to make predictions for unlabeled production inputs. Unsupervised models may discover their own structure of unlabeled data. Unsupervised models typically do not require labeled training data.

Many times, a developer creates an artificially intelligent model, tunes the model for the particular environment, and uses the model to predict outcomes. However, the developer is rarely able to explain the process used by the model to determine the outcome. In other words, it is difficult to explain the inner workings of a model with respect to the underlying cause that a specific set of inputs produced a particular outcome.

Many times, the inability to explain what caused the inputs to generate, or otherwise obtain, a specific outcome, creates a large amount of resource consumption in the re-creation of the process between the inputs and the outcome. For example, if a model outputs B for inputs X, Y and Z, human intervention may be required to recreate the entire input process between X, Y and Z to understand how it produces B.

In order to minimize the relatively large resource consumption required to recreate such a process, there has been a trend in the field of artificial intelligence called explainable artificial intelligence. Explainable artificial intelligence may use machine processes in order to attribute the outcome of a process to the important inputs. Various mathematical equations have been written and deployed to identify a solution that attributes the outcome of a process to the important inputs.

These solutions include SHAP (Shapley additive exPlanations) by Lundberg and Lee. SHAP is based on the Shapley Values optimization, which utilizes a collaborative game where players are associated with the outcome of the game. When using SHAP in AI, the outcome of the game is the prediction, and the players are the various features inputted to determine the prediction. The result of SHAP is similar to feature importance. SHAP can be explained as optimized aggregations of Shapley values. As such, SHAP provides a solution for identification of a single most important input.

However, SHAP does not provide a solution for identifying a collaboration or group of inputs because the group of inputs working in concert, to some extent, breaks the rules underpinning the aforementioned cooperative game. Therefore, SHAP cannot be used to identify a collaboration or group of inputs working in concert.

Another solution used in explainable AI is integrated gradients by Sundararajan, Tal and Yan. Integrated gradients is a system that identifies the most important inputs by integrating each input with respect to a baseline. However, currently, integrated gradients have been used in single models. However, as AI becomes more prevalent, and models have become interconnected, it would be desirable for a system that can propagate the explainable AI through a cascade of models.

SUMMARY OF THE DISCLOSURE

Apparatus and methods for conserving resources while identifying a subset of inputs, from among a set of inputs that most contributed to an output. The method may include receiving a characterization output. The characterization output may characterize a first data structure.

The characterization output may be executed by an artificial intelligence model or system. A characterization output may be probability of a set of inputs being associated with a specific output. For example, an unlabeled image may be input into one or more artificial intelligence model. The artificial intelligence models may characterize, or label, the image as a butterfly with a probability of 0.92, also referred to as 92%. In such an example, the set of inputs may be the pixels of the image and the first data structure may be image. In another example, an unlabeled set of transactions associated with an entity may be input into one or more artificial intelligence models. The artificial intelligence models may characterize, or label, the entity as being associated with suspicious activity with a probability of 0.62, also referred to as 62%. In such an example, the set of inputs may be the set of transactions and the first data structure may be a digital structure identifying the entity.

The methods may determine a plurality of most important contributing factors to the characterizing the first data structure. In the example regarding the image, the most important contributing factors may be the pixels of the image that are most relevant to the determination that the image identifies a butterfly. In the example regarding the entity, the most important contributing factors may include the transactions that are most relevant to the determination that the entity is associated with suspicious activity.

The determination of the plurality of most important contributing factors may include a plurality of steps. It should be appreciated that the order of the steps may be performed in any suitable order.

An initial step may include identifying a plurality of data elements associated with the first data structure at a monitoring data unit. Examples of data elements may include transactions, pixels or any other suitable data elements.

A subsequent step may include feeding the plurality of data elements into a plurality of models. The plurality of models may be artificial intelligence models. The plurality of models may operate in parallel, in sequence or in a combination of both parallel and sequence.

Another subsequent step may include processing the plurality of data elements at the plurality of models. The processing may include one or more categorization identifications of each of the data elements.

Yet another subsequent step may include identifying a plurality of outputs from the plurality of modes. The plurality of outputs may include the one or more identification of each of the data elements.

Still another subsequent step may include feeding the plurality of outputs into an event processor. A sixth step may include processing the plurality of outputs at the event processor. The processing may include categorization identification of each of the plurality of outputs. Additionally, the event processor may group the plurality of outputs into a plurality of events. In certain embodiments, the grouping of the plurality of outputs into the plurality of events may be included in the processing the plurality of outputs. In other embodiments, the grouping the plurality of outputs may be included as a separate step.

Another subsequent step may include inputting the plurality of events into a determination processor.

Another subsequent step may include determining a probability that the first structure is associated with the characterization output. The determination processor may determine that the probability is above or below a threshold probability of being associated with the characterization output. In some embodiments, the characterization output may be received at this step instead of prior to the determination.

Upon determination of the characterization output, the probability that the first structure is associated with characterization output and whether the determined probability is above or below a threshold probability, there may an algorithm executed in order to identify a predetermined number of data elements, or subset of data elements, included in the plurality of data elements, that most contributed to the characterization output.

The algorithm may include multiplying the integrated gradient of the determination processor with respect to the plurality of outputs by (the integrated gradient of the event processor with respect to the plurality of data elements divided by the plurality of outputs). The result of this algorithm may be a vector. The result of this algorithm may be a matrix.

An equation for determining the integrated gradient of the event processor, or the determination processor with respect to the plurality of data elements may be equation B, which is described below in the detailed description of the invention.

$$IG_W(x) = \int_{t_0}^{t_f} \frac{\partial W}{\partial x} \frac{dx}{dt} dt \qquad \text{Equation B}$$

An equation for determining the integrated gradient of the determination processor with respect to the plurality of events may be equation F.

$$IG_{determination\ processor}(\text{plurality of events}) = \int_{t_0}^{t_f} d(\text{plurality of events}). \qquad \text{Equation F:}$$

In Equation F, IG may refer to the integrated gradient.

The vector or the matrix may include a subset of the plurality of data elements. The vector or matrix may also include a probability that each data element, included in the subset of data elements, contributed to the characterization output. The subset of the plurality of data elements included in the vector or matrix may be ranked. The ranking may be based on the probability that each data element contributed to the characterization output. In some embodiments, higher ranking data elements may have higher probabilities of being associated with the characterization output.

A predetermined number of data elements may be selected from the ranked subset of the plurality of data elements. The selected subset may include a predefined number of data elements. The selected subset may include a predefined percentage of the data elements. The selected subset may be the top of ranked list. The top predetermined number of data elements may be identified as the plurality of most important contributing factors to the characterizing the first data structure.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
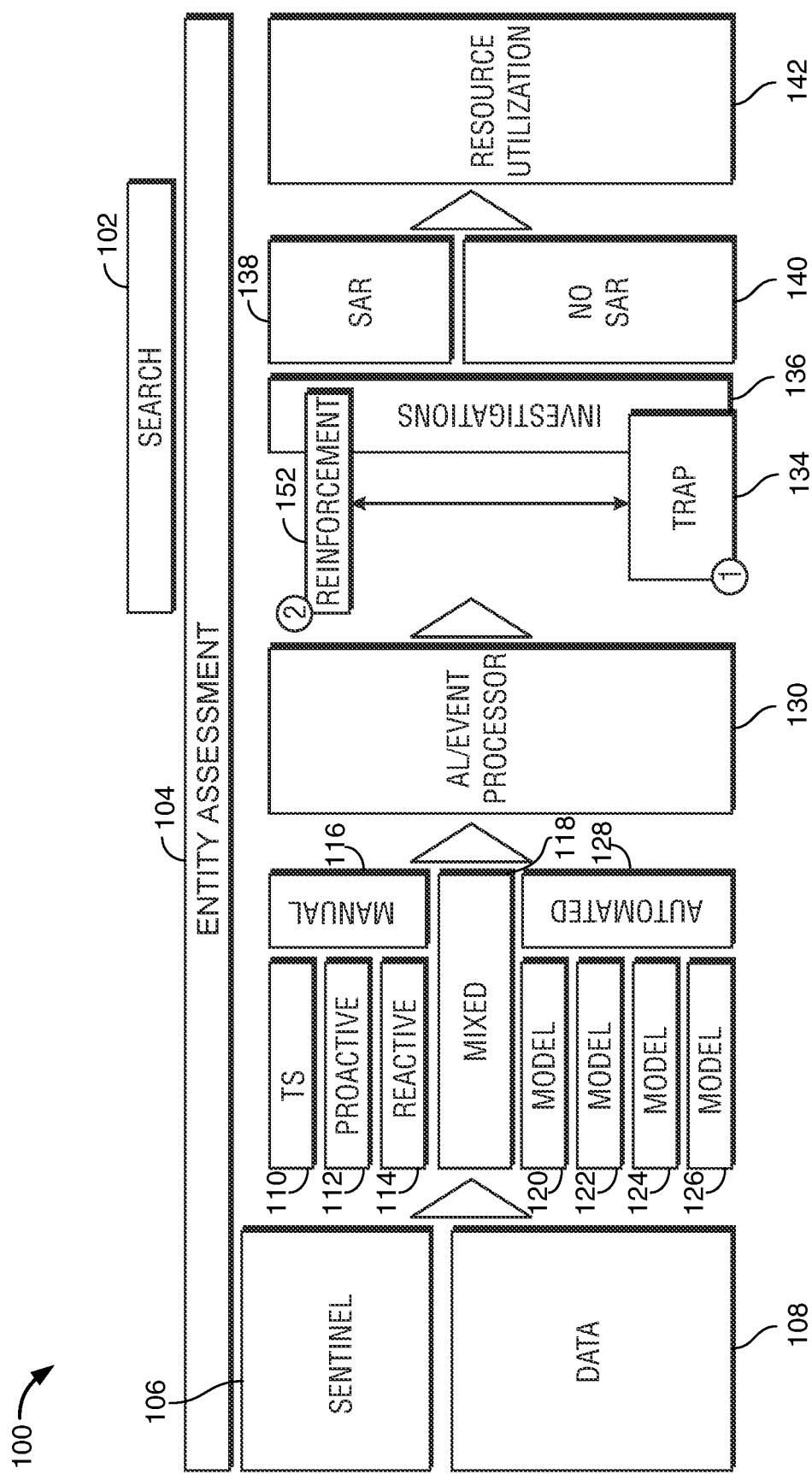
FIG. 1 shows an illustrative diagram in accordance with principles of the disclosure.

Apparatus and methods for conserving resources during a suspicious activity reporting ("SAR") investigation is provided. Methods may include receiving a SAR output. The SAR output may be received from a neural network. The SAR output may characterize a first entity. The SAR output may be a number between zero and one. The SAR output may be a probability that the entity is associated with suspicious activities.

Methods may also include determining a plurality of most important contributing factors to the SAR output. In order to determine the plurality of most important contributing factors, methods may include identifying a plurality of suspicious data elements at a monitoring data unit. Such a monitoring data unit may include a sentinel and a data store. The sentinel may 'watch' the data store for any suspicious activity. In order to do so, the sentinel may have large amounts of historical information that identify labeled suspicious activities. As such, the sentinel may include one or more artificial intelligence structures, or models, such as a neural network.

Once the information is retrieved by the sentinel, the sentinel may feed the plurality of suspicious data elements into a plurality of models. The plurality of suspicious data elements may include entity attributes and/or transaction attributes. The plurality of models may also include artificial intelligence structures. Each of the plurality of models may review the data using its own set of algorithms. It should be noted that the sentinel may be grouped with the plurality of models to be used as, and referred to as, an amalgamated artificial intelligence modeling structure.

The plurality of models may identify a plurality of suspicious activity outputs. The plurality of suspicious activity outputs may be fed into an event processor. The event processor may group the plurality of suspicious activity outputs into a plurality of suspicious events. The plurality of suspicious events may be input into a determination processor. The determination processor may be a SAR/No SAR determination processor. The determination processor may be referred to, in certain instances, as a trap.

The determination processor may determine a probability of the first entity being associated with an affirmative SAR output. When the determination processor determines that the probability of the first entity being associated with an affirmative SAR output is higher than a threshold probability, the determination processor, or an associated module, may identify a predetermined number of data elements that contributed most to the affirmative SAR output. The following equations (Equations A-E) may be utilized in the identification of the data elements that contributed most to the affirmative SAR output.

The identifying may include executing Equation A.

It should be appreciated that an equation for determining the integrated gradient may be Equation B:

$$IG_W(x) = \int_{t_0}^{t_f} \frac{\partial W}{\partial x} \frac{dx}{dt} dt \qquad \text{Equation B}$$

In Equation B, IG may refer to the integrated gradient and w may refer to the module that outputted an output, x may refer to the original inputs into a model that eventually fed into w.

In the event that w in Equation B is energy, then $$\frac{\partial W}{\partial x}$$

may be force. In such an event Equation B may be equivalent to Equation C.

$$IG_W(x) = F\Delta x \qquad \text{Equation C:}$$

Multistage equations may be expressed as Equation D.

$$C = f(B) = f(g(A)) \qquad \text{Equation D:}$$

Equation D can also be expressed as A causes B causes C, or A→B→C.

Equation E may be used for multistage explanations, which can also be understood as explaining the cause of an outcome that occurred by identifying the inputs that most contributed to the output. In multistage explanations, the cause or group of causes may or may not be multiple stages away from the outcome.

$$IG_C(A) = IG_C(B) \cdot \frac{IG_B(A)}{B} \qquad \text{Equation E}$$

Equation E can be expressed as the integrated gradient of module c with respect to inputs A, which is equivalent to the integrated gradient of module c with respect to inputs B multiplied by [the integrated gradient of module B with respect to inputs A divided by the inputs to module B].

As such, Equation E may be a generic equation for Equation A. Therefore, Equation A can be expressed as the integrated gradient of the determination processor using the suspicious data elements as the input is equivalent to the integrated gradient of the determination processor using the inputs to the event processor as input multiplied by [the integrated gradient of the event processor using the suspicious data elements as inputs divided by the inputs into the event processor].

Each of the following may be tensors: the suspicious data elements, which may be referred to as A, the inputs to the event processor, which may be referred to as B and the suspicious events or the SAR/No SAR determination, which may be referred to as C. A vector or a matrix may be Equation A $$\text{IntegratedGradient}_{determination\ processor}(\text{data elements inputted into the models}) =$$
$$\frac{\text{IntegratedGradient}_{determination\ processor}(\text{inputs to the event processor}) \times \text{IntegratedGradient}_{event\ processor}(\text{data elements inputted into the models})}{\text{inputs to the event processor}}$$

identified from each of the aforementioned tensors. The vector and/or matrix may be a subset of the tensor used to compute Equation A. In the event that at least one vector is used as input in the computation of equation A or E, the output of equation A or E may be vector. In the event that all of inputs are matrices, the output of the computation of equation A or E may be a matrix.

In the event that the output of equation A or equation E is a vector, or a matrix, the vector or the matrix may include a subset of the plurality of suspicious data elements. The vector or matrix may also include a probability for each suspicious data element included in the subset. The probability may identify the relationship that each suspicious data element contributed to the affirmative SAR output.

The subset of the plurality of suspicious data elements may be ranked by the probability that each suspicious data element contributed to the SAR output. A top predetermined number of suspicious data elements that ranked highest may be selected. The selected group of data elements may be determined as most impactful on the SAR output vis-à-vis the plurality of suspicious data elements.

It should be noted that the Integrated gradients allow for relative measurement. Therefore, a baseline is important for understanding how the initial data elements resulted in the output. This may also be understood as understanding the how (and which data elements were most important) as data elements pass and evolve through the cascade of models until the final SAR/No SAR determination.

In order to properly identify the difference between the baseline and the output, it may be important to maintain an unchanged value in the baseline. The SAR/No SAR determination may be based on information relating to entities and to transactions. In order to explain the difference between the baseline and the output with regard to the transactions, the entities may remain unchanged in the baseline. In order to explain the difference between the baseline and the output with regard to the entities, the transaction may remain unchanged in the baseline.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram of system 100. System 100 may be a monitoring and alerting system. The monitoring and alerting system may identify entities from a plurality of entities that rank above a threshold probability of being associated with a suspicious activity report. The monitoring and alerting system may also identify a predetermined number of events that caused the entity to rank above the threshold probability.

System 100 includes entity assessment 104. Entity assessment 104 includes sentinel 106 and data 108. Sentinel 106 may be a monitoring module or plurality of monitoring modules for identifying data elements included in data 108. The identified data elements may be suspicious data elements. Suspicious data elements may include transactions, such as deposits, withdrawals, funds transfers, account openings and account closures and any other suitable suspicious transactions.

It should be noted that sentinel 106 may identify suspicious data elements based on similarities between the suspicious data elements and previously identified suspicious data elements. In order to learn what data elements can be identified as suspicious, an artificial intelligence model, or group of artificial intelligence models may be deployed. The artificial intelligence model may include a neural network. The neural network may learn from previous experience regarding suspicious data elements.

The following models may be used in order to identify suspicious data elements. The models may include TS 110, proactive 112 and reactive 114. TS 110, proactive 112 and reactive 114 may be manual models, as shown at 116. TS 110 may be a portal for submitting concerns about suspicious activity.

The models may also include model 120, model 122, model 124 and model 126. Models 120, 122, 124 and 126 may be automated models, as shown at 128. The automated models, shown at 128, may be combined, or mixed, with manual models 116, as shown at 118.

The suspicious data elements, as processed by the variety of models, may be input into AL/Event processor 130. AL may enrich the TS submissions by retrieving relevant data from various databases before passing it on for review at investigations 136. In part, suspicious data elements are received at the appropriate investigation location within investigations 136 because of AL. AL/Event processor 130 may combine the processed data elements into groupings of data elements. The groupings of data elements may be identified as events, also referred to herein as suspicious events.

Upon identifying events, the events are inputted into trap 134. Trap 134 may determine whether a plurality of events associated with an entity categorize the entity as being associated with a suspicious activity report ("SAR"). The output of trap 134 may be transmitted to reinforcement 152. Reinforcement 152 may provide additional information to trap 134. Investigations, shown at 136 may be implemented for entities associated with SARs.

Entities may be allocated, after being processed through trap 134, in a SAR memory location, such as 138, or in a no SAR memory location, such as 140. Entities that are included in a no SAR memory location may avoid being processed through an investigation module, while entities that are included in a SAR memory location may be processed through the investigation module. Search indicator 102 may indicate that trap 134, reinforcement 152, investigations 136, SAR 138 and no SAR 140 are included in the search section of the entity assessment.

It should be appreciated that investigations 136 may include performing a backward tracing of the data elements, included in data 108. These identified data elements may be the data elements that had the greatest impact on the SAR determination executed at trap 134. The backward tracing may utilize a process also referred to as integrated gradients, which is discussed in greater detail in the beginning of the detailed description of the invention section.

Resource utilization 142 may, post investigation, identify whether the resources expended on investigation of a SAR were accurately expended. For example, if an entity was placed in the SAR memory by trap 134, and after investigations, it was determined that the entity should have been placed in the no SAR memory, the resources expended on the investigation were wasted resources. Also, if an entity was placed in the SAR memory by trap 134, and after investigations, it was determined that the entity was properly placed in the SAR memory, the resources expended on the investigation was appropriately used resources. As such, the SAR/No SAR determination post investigation decision information may be transmitted to TS 110, proactive 112, reactive 114, model 120, model 122, model 124 and model 126 to enable the models to learn further when resources are wasted and when resources have been used appropriately.

Figure 2:
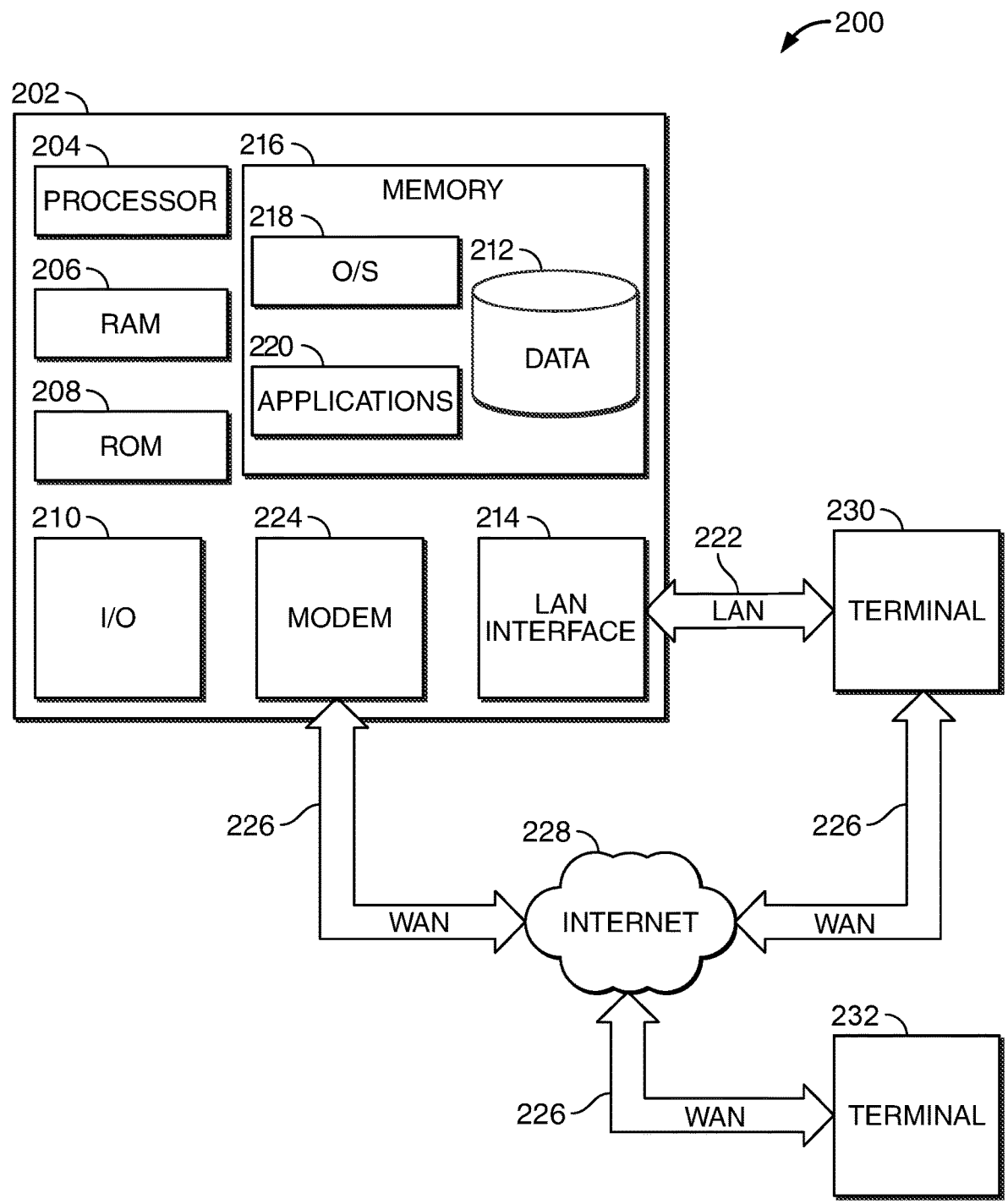
FIG. 2 shows another illustrative diagram in accordance with principles of the disclosure.

FIG. 2 shows an illustrative block diagram of system 200 that includes computer 202. Computer 202 may alternatively be referred to herein as an "engine," "server" or a "computing device." Computer 202 may be a workstation, desktop, laptop, tablet, smartphone, or any other suitable computing device. Elements of system 200, including computer 202, may be used to implement various aspects of the systems and methods disclosed herein. Each of the sentinel, models and processors illustrated in FIG. 1 may include some or all of the elements and apparatus of system 200.

Computer 202 may have a processor 204 for controlling the operation of the device and its associated components, and may include RAM 206, ROM 208, input/output circuit 210, and a non-transitory or non-volatile memory 216. Machine-readable memory may be configured to store information in machine-readable data structures. The processor 204 may also execute all software running on the computer. Other components commonly used for computers, such as EEPROM or Flash memory or any other suitable components, may also be part of the computer 202.

The memory 216 may be comprised of any suitable permanent storage technology—e.g., a hard drive. The memory 216 may store software including the operating system 218 and application(s) 220 along with any data 212 needed for the operation of the system 200. Memory 216 may also store videos, text, and/or audio assistance files. The data stored in Memory 216 may also be stored in cache memory, or any other suitable memory.

Input/output ("I/O") module 218 may include connectivity to a microphone, keyboard, touch screen, mouse, and/or stylus through which input may be provided into computer 202. The input may include input relating to cursor movement. The input/output module may also include one or more speakers for providing audio output and a video display device for providing textual, audio, audiovisual, and/or graphical output. The input and output may be related to computer application functionality.

System 200 may be connected to other systems via a local area network (LAN) interface 214. System 200 may operate in a networked environment supporting connections to one or more remote computers, such as terminals 230 and 232. Terminals 230 and 232 may be personal computers or servers that include many or all of the elements described above relative to system 200. The network connections depicted in FIG. 2 include a local area network (LAN) 222 and a wide area network (WAN) 226, but may also include other networks. When used in a LAN networking environment, computer 202 is connected to LAN 222 through a LAN interface 214 or an adapter. When used in a WAN networking environment, computer 202 may include a modem 224 or other means for establishing communications over WAN 226, such as Internet 228.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 220, which may be used by computer 202, may include computer executable instructions for invoking functionality related to communication, such as e-mail, Short Message Service (SMS), and voice input and speech recognition applications. Application program(s) 220 (which may be alternatively referred to herein as "plugins," "applications," or "apps") may include computer executable instructions for invoking functionality related to performing various tasks. Application programs 220 may utilize one or more algorithms that process received executable instructions, perform power management routines or other suitable tasks. Application programs 220 may utilize one or more decisioning processes for the processing of calls received from calling sources as detailed herein.

Application program(s) 220 may include computer executable instructions (alternatively referred to as "programs"). The computer executable instructions may be embodied in hardware or firmware (not shown). The computer 202 may execute the instructions embodied by the application program(s) 220 to perform various functions.

Application program(s) 220 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 212, and any other suitable information, may be stored in memory 216.

The invention may be described in the context of computer-executable instructions, such as applications 220, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 202 and/or terminals 230 and 232 may also include various other components, such as a battery, speaker, and/or antennas (not shown). Components of computer system 202 may be linked by a system bus, wirelessly or by other suitable interconnections. Components of computer system 202 may be present on one or more circuit boards. In some embodiments, the components may be integrated into a single chip. The chip may be silicon-based.

Terminal 230 and/or terminal 232 may be portable devices such as a laptop, cell phone, tablet, smartphone, or any other computing system for receiving, storing, transmitting and/or displaying relevant information. Terminal 230 and/or terminal 232 may be one or more user devices. Terminals 230 and 232 may be identical to system 200 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 3:
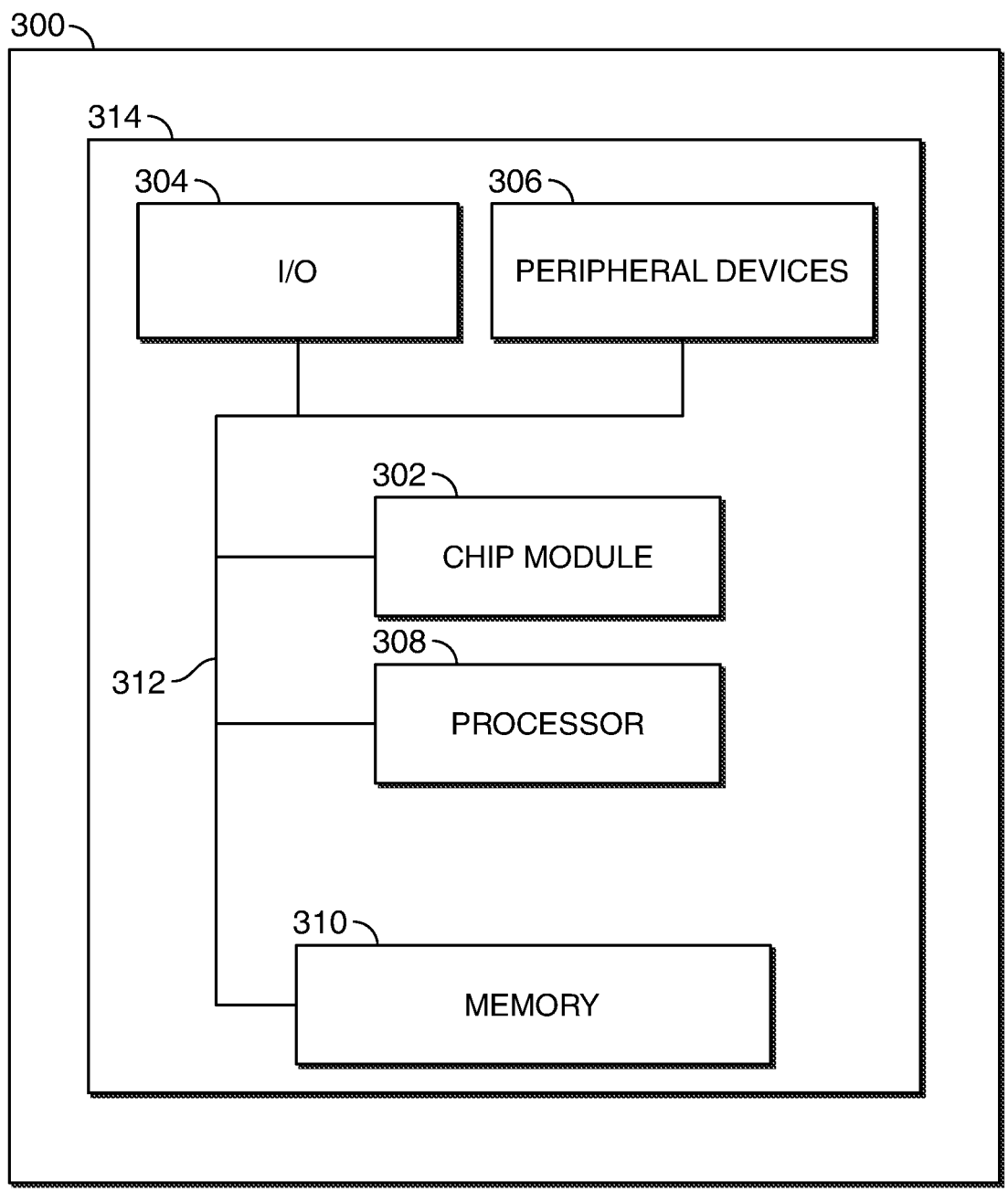
FIG. 3 shows yet another illustrative diagram in accordance with principles of the disclosure.

FIG. 3 shows illustrative apparatus 300 that may be configured in accordance with the principles of the disclosure. Apparatus 300 may be a computing device. Apparatus 300 may include one or more features of the apparatus shown in FIG. 2. Apparatus 300 may include chip module 302, which may include one or more integrated circuits, and which may include logic configured to perform any other suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable media or devices; peripheral devices 306, which may include counter timers, real-time timers, power-on reset generators or any other suitable peripheral devices; logical processing device 308, which may compute data structural information and structural parameters of the data; and machine-readable memory 310.

Machine-readable memory 310 may be configured to store in machine-readable data structures: machine executable instructions, (which may be alternatively referred to herein as "computer instructions" or "computer code"), applications such as applications 220, signals, and/or any other suitable information or data structures.

Components 302, 304, 306, 308 and 310 may be coupled together by a system bus or other interconnections 312 and may be present on one or more circuit boards such as circuit board 314. In some embodiments, the components may be integrated into a single chip. The chip may be silicon-based.

Thus, a resource conservation system for scalable identification of a subset of inputs from among a group of inputs that most contributed to an output is provided. Persons skilled in the art will appreciate that the present invention can be practiced by other than the described embodiments, which are presented for purposes of illustration rather than of limitation. The present invention is limited only by the claims that follow.

What is claimed is:

1. A method for conserving resources during a suspicious activity reporting ("SAR") investigation, the method comprising:

receiving a SAR output characterizing a first entity, said SAR output being a number between zero and one;

determining a plurality of most important contributing factors to the SAR output, the determining comprising:

identifying a plurality of suspicious data elements at a monitoring data unit;

feeding the plurality of suspicious data elements into a plurality of models;

processing the plurality of suspicious data elements at the plurality of models;

identifying a plurality of suspicious activity outputs from the plurality of models;

feeding the plurality of suspicious activity outputs into an event processor;

processing the plurality of suspicious activity outputs at the event processor;

grouping the plurality of suspicious activity outputs into a plurality of suspicious events at the event processor;

inputting the plurality of suspicious events into a determination processor;

determining, at the determination processor, a probability of the first entity being associated with an affirmative SAR output;

determining, at the determination processor, that the probability of the first entity being associated with an affirmative SAR output is higher than a threshold probability of being associated with an affirmative SAR output;

in order to identify a predetermined number of data elements contributing to the affirmative SAR output: performing the following equation:

$$\text{IntegratedGradient}_{determination\ processor}(\text{data elements inputted into the models}) = \text{IntegratedGradient}_{determination\ processor}(\text{inputs to the event processor model output}) \times \frac{\text{IntegratedGradient}_{event\ processor}(\text{data elements inputted into the models})}{\text{inputs to the event processor model output}}$$

outputting, from the equation, a vector comprising:

a subset of the plurality of suspicious data elements; and a probability for each suspicious data element, included in the subset of suspicious data elements, that the suspicious data element contributed to the affirmative SAR output;

ranking the subset of the plurality of suspicious data elements included in the vector by the probability that the suspicious data element contributed to the affirmative SAR output; and identifying a predetermined number of suspicious data elements included in the subset of suspicious data elements, said predetermined number of suspicious data element that rank highest based on the probability, said predetermined number of suspicious data elements comprising a group of data elements most impactful on the SAR output vis-à-vis the plurality of suspicious data elements.

2. The method of claim 1, wherein the SAR output is received from a neural network.

3. The method of claim 1, wherein an equation for determining the integrated gradient of the determination processor with respect to the suspicious events outputs is:

$$IG_{determination\ processor}(\text{plurality of suspicious events}) = \int_{t_0}^{t_f} d(\text{plurality of suspicious events}).$$

4. The method of claim 1, wherein an equation for determining the integrated gradient of the event processor with respect to the plurality of suspicious data elements is:

$$IG_W(x) = \int_{t_0}^{t_f} \frac{\partial W}{\partial x} \frac{dx}{dt} dt.$$

5. The method of claim 1 where each of the suspicious data elements, suspicious activity outputs and suspicious events are tensors.

6. The method of claim 5 further comprising identifying a vector or a matrix from the suspicious data elements tensor.

7. The method of claim 5 further comprising identifying a vector or a matrix from the suspicious activity outputs tensor.

8. The method of claim 5 further comprising identifying a vector or a matrix from the suspicious events tensor.

9. The method of claim 1, wherein the plurality of suspicious data elements includes entity attributes.

10. The method of claim 1, wherein the plurality of suspicious data elements includes transaction attributes.

11. A method for conserving resources while identifying a subset of inputs, from among a set of inputs, that most contributed to an output, the method comprising:
receiving a characterization output characterizing a first data structure;
determining a plurality of most important contributing factors to the characterizing the first data structure, the determining comprising:
identifying a plurality of data elements associated with the first data structure at a monitoring data unit;
feeding the plurality of data elements into a plurality of models;
processing the plurality of data elements at the plurality of models;
identifying a plurality of outputs from the plurality of models;
feeding the plurality of outputs into an event processor;
processing the plurality of outputs at the event processor;
grouping the plurality of outputs into a plurality of events at the event processor;
inputting the plurality of events into a determination processor;
determining, at the determination processor, a probability of the first data structure being associated with the characterization output;
determining, at the determination processor, that the determined probability is over a threshold probability of being associated with the characterization output;
in order to identify a predetermined number of data elements, included in the plurality of data elements, contributing to the characterization output:
multiplying the integrated gradient of the determination processor with respect to the plurality of outputs by (the integrated gradient of the event processor with respect to the plurality of data elements divided by the plurality of outputs), which results in a vector of:
a subset of the plurality of data elements; and
a probability that each data element, included in the subset of data elements, contributed to the characterization output;
ranking the subset of the plurality of data elements of the vector by the probability that each data element contributed to the characterization output; and
identifying a top predetermined number of data elements from the ranked subset of the plurality of data elements, the top predetermined number of data elements being the plurality of most important contributing factors to the characterizing the first data structure.

12. A resource conservation system, the system comprising:
a determination processor that:
determines a characterization output that characterizes each of a plurality of data structures; and
determines a plurality of most important contributing factors to the characterizing each of the plurality of data structures, the determination processor executes the following executable steps in order to determine the plurality of most important contributing factors:
identifies a plurality of data elements associated with each data structure, included in each of the plurality of data structures, at a monitoring data unit, said monitoring data unit within the determination processor;
feeds the plurality of data elements into a plurality of models;
processes the plurality of data elements at the plurality of models;
identifies the plurality of outputs from the plurality of models;
feeds the plurality of outputs into an event unit, said event unit within the determination processor;
processes the plurality of outputs at the event unit;
groups the plurality of outputs into a plurality of events at the event unit;
inputs the plurality of events into a determination unit, said determination unit within the determination processor;
determines, at the determination unit, a probability for each of the plurality of data structures being associated with each characterization output;
determines, at the determination unit, that the determined probability is over a threshold probability of being associated with the characterization output;
in order to identify a predetermined number of data elements, included in the plurality of data elements, contributing to the characterization output, the determination processor:

multiplies the integrated gradient of the determination unit with respect to the plurality of outputs by (the integrated gradient of the event unit with respect to the plurality of data elements divided by the plurality of outputs), which results in a vector of:
  a subset of the plurality of data elements; and
  a probability that each data element, included in the subset of data elements, contributed to the characterization output;
ranks the subset of the plurality of data elements of the vector by the probability that each data element contributed to the characterization output; and
identifies a top predetermined number of data elements from the ranked subset of the plurality of data elements, the top predetermined number of data elements being the plurality of most important contributing factors to the characterizing each of the plurality data structures.

13. The system of claim 12, wherein an equation for determining the integrated gradient of the event unit with respect to the plurality of data elements is:

$$IG_W(x) = \int_{t_0}^{t_f} \frac{\partial W}{\partial x} \frac{dx}{dt} dt.$$

14. The system of claim 12, wherein an equation for determining the integrated gradient of the determination unit with respect to the plurality of outputs is:

$$IG_{determination\ processor}(\text{plurality of events}) = \int_{t_0}^{t_f} d(\text{plurality of events}).$$

* * * * *